(12) United States Patent  
Joublin

(10) Patent No.: US 8,611,555 B2
(45) Date of Patent: Dec. 17, 2013

(54) ROBOT HEAD WITH ARTIFICIAL EARS

(75) Inventor: Frank Joublin, Mainhausen (DE)

(73) Assignee: Honda Research Institute Europe GmbH, Offenbach/Main (DE)

(*) Notice: Subject to any disclaimer, the term of this patent is extended or adjusted under 35 U.S.C. 154(b) by 1254 days.

(21) Appl. No.: 11/765,988

(22) Filed: Jun. 20, 2007

(65) Prior Publication Data

US 2007/0297632 A1 Dec. 27, 2007

(30) Foreign Application Priority Data

Jun. 22, 2006 (EP) ..................................... 06012900

(51) Int. Cl.
*H04R 3/00* (2006.01)

(52) U.S. Cl.
USPC ................. 381/92; 381/122; 381/356; 901/46

(58) Field of Classification Search
USPC ............. 381/112, 122, 92, 111, 356, 355, 56, 381/360, 361, 364, 150; 901/50, 1, 46, 38, 901/36; 318/568.12, 568.11; 74/473.12
See application file for complete search history.

(56) References Cited

U.S. PATENT DOCUMENTS

| | | | |
|---|---|---|---|
| 5,119,420 A * | 6/1992 | Kato et al. | 381/1 |
| 7,016,505 B1 | 3/2006 | Nakadai et al. | |
| 7,113,848 B2 * | 9/2006 | Hanson | 700/245 |
| 7,215,786 B2 * | 5/2007 | Nakadai et al. | 381/94.1 |
| 2006/0129275 A1 | 6/2006 | Ogawa et al. | |

OTHER PUBLICATIONS

Michele Rucci, Gerald M. Edelman, and Jonathan Wray "Adaptation of Orienting Behavior: From the Barn Owl to a Robotic System", IEEE Transactions on Robotics and Automation, vol. 15, No. 1, Feb. 1999.*
European Search Report, European Application No. 06012900, Jan. 16, 2007, 8 pages.

* cited by examiner

*Primary Examiner* — Vivian Chin
*Assistant Examiner* — Con P Tran
(74) *Attorney, Agent, or Firm* — Fenwick & West LLP

(57) ABSTRACT

A supporting head is provided with binaural artificial ears. Each binaural artificial ear comprises an auricle-shaped structure and a microphone. In order to enhance auditory localization cues, at least an upper part of the head is provided with an acoustically dampening surface.

15 Claims, 4 Drawing Sheets

ROBOT HEAD WITH ARTIFICIAL EARS

RELATED APPLICATIONS

This application is related to and claims priority to European Patent Application No. 06 012 900 filed on Jun. 22, 2006, entitled "Robot Head with Artificial Ears." This application is also related to a U.S. patent application Ser. No. 11/765,965 filed on Jun. 20, 2007 entitled "Robot Having a Head with Artificial Ears."

FIELD OF THE INVENTION

The present invention relates to robot heads, specifically robot heads equipped with dedicated acoustical sensing systems.

BACKGROUND OF THE INVENTION

Sound localization estimates the location of a sound source using auditory cues such as the interaural time differences (ITD) and the interaural level differences (ILD). The auditory cues are determined by processing acoustic signals sensed by two or more microphones. The acoustic signals picked up by the microphones are susceptible to various factors of the environment surrounding the microphones such as the location of the microphones or surfaces surrounding the microphones that may reflect or absorb the acoustic signals before reaching the microphones.

The microphones can be mounted on a robot head. When the microphones are mounted on the head, the configuration of the head such as the surface of the robot head affects the accuracy of the sound localization.

SUMMARY OF THE INVENTION

It is the object of the present invention to provide a robot head including artificial binaural ears.

In one embodiment of the present invention provides a robot head including actuators with at least one degree of freedom so that the head can be moved to face the estimated position of a sound source. The head is provided with binaural artificial ears including an auricle-shaped structure and a microphone. The upper part of the head includes an acoustically dampening surface.

In one embodiment of the present invention, the artificial ears can be functionally coupled to a computer provided at the inside or outside of the head. The computer is designed to estimate the location of a sound source based on auditory localization cues such as Interaural Time Differences (ITD) or Interaural Level Differences (ILD).

In one embodiment of the present invention, the acoustically dampening surface is effective for frequencies above 2 kHz.

In one embodiment of the present invention, the acoustically dampening surface is effective for acoustical waves having a wavelength equal to or less than the distance between the two microphones of the binaural artificial ears.

In one embodiment of the present invention, the acoustically dampening surface is a surface layer attached to the robot head.

In one embodiment of the present invention, the acoustically dampening surface is made of a silicone-like material.

In one embodiment of the present invention, the acoustically dampening surface is formed by performing surface treatment on the robot head.

In one embodiment of the present invention, the robot head is mounted on a humanoid robot having a body, two legs, and two arms.

In one embodiment of the present invention, auditory localization cues sensed via binaural artificial ears attached to or integrated into the head of a robot are enhanced. The embodiment provides at least the upper part of the head with an acoustically dampening surface.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present invention can be readily understood by considering the following detailed description in conjunction with the accompanying drawings.

DETAILED DESCRIPTION OF THE INVENTION

Figure 1:
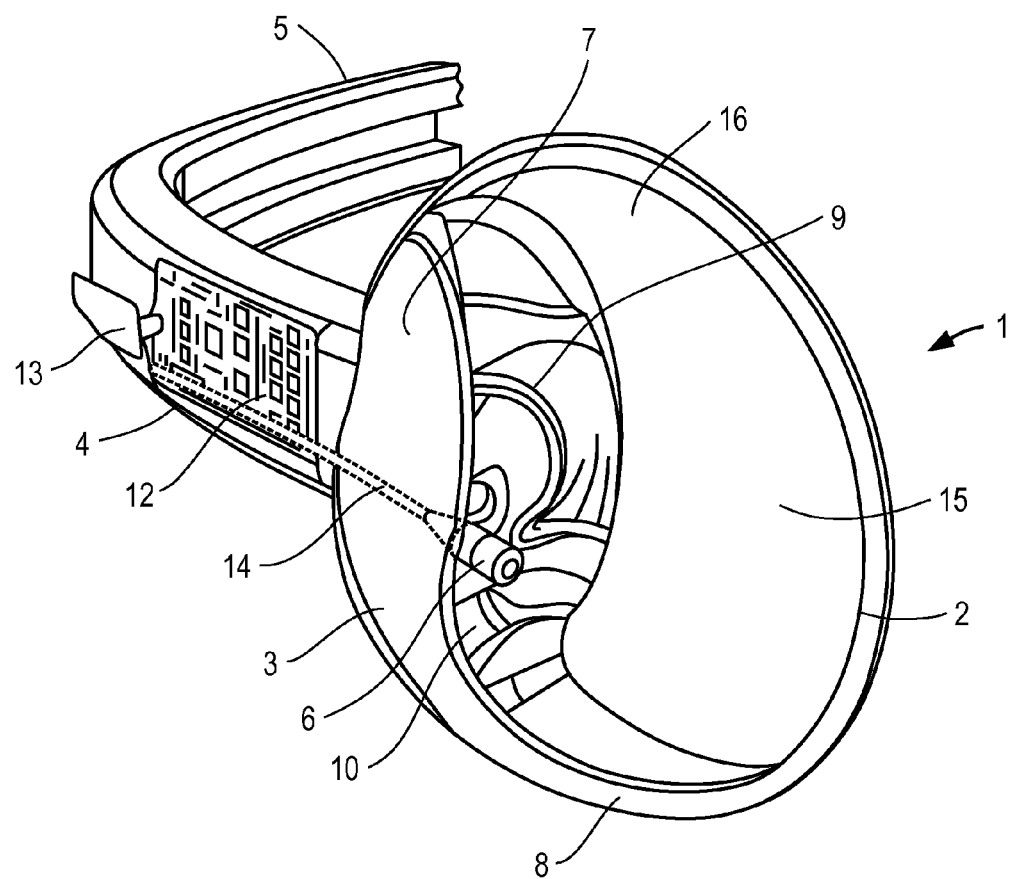
FIG. 1 illustrates a perspective view of an artificial ear according to one embodiment of the present invention.

A preferred embodiment of the present invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

FIG. 1 illustrates a perspective view of an artificial ear 1, according to one embodiment of the present invention. The embodiment of FIG. 1 does not provide a replica of the human ear, but provides an artificial ear adapted for use with a robot, especially a robot with a head.

In the embodiment of FIG. 1, the artificial ear 1 includes a circular ground base plate 2. An auricle-shaped structure 3 extends outside the base plate 2. At the rear end of the auricle-shaped member 3, an extension 4 is integrated to the base plate 2. The extension 4 contains electrical circuitry 12 such as pre-amplifying circuits. The electrical circuitry 12 is provided with an interface 13 in order to transmit the pre-processed electrical signals to a computing unit of a robot. The computing unit can then determine target subjects for the robot based on the processed signals, for example, by estimating sound localization. In one embodiment, the robot then moves its head to face the estimated location of the sound source or moves to the estimated location of the sound source.

The longitudinal extension 4 may include an elastic and bendable mechanical connection member 5 that can be used for electrically connecting the artificial ear 1 to a second artificial ear 1' arranged at the opposite side of the robot's head.

The auricle-shaped structure 3 of the artificial ear 1 defines a hollow concha region 18. A microphone 6 is placed at the bottom of the concha region 10 where the sound converges. The hollow concha region 10 can be in a shape of an asymmetrical cone enhancing acoustic signals coming from a sound source in front of the robot head. It is important to make the concha region 10 and adjacent regions asymmetric to obtain localization cues in the elevation plane. The concha region 10 is open to the outside to allow the microphone 6 to gather sounds from the outside.

The microphone 6 communicates signals with the processing circuitry 12 via a functional connection 14.

The rear end and/or the lower end of the auricle-shaped structure 3 can include acoustic shields 7, 8. The acoustic shields 7, 8 are designed to shield or shadow the noises originating from noise sources at the back of the artificial ear 1 or below the artificial ear 1.

In one embodiment of the present invention, the acoustic shields 7, 8 may be formed by folding an outer edge integrated with the auricle-shaped structure 3.

The rear acoustic shield 7 covers the concha region 10 at least in a partially overlapping manner to shield or shadow the artificial ear 1 efficiently against noises generated by typical noise sources located at the back of the artificial ear 1.

On the other hand, the width of the lower acoustic shield 8 can be made much smaller than the width of the rear acoustic shield 7 such that the area the lower acoustic shield overlaps with the base plate 2 is much smaller than the area the rear acoustic shield 7 overlaps with the base plate 2.

The front region 15 and the upper region 16 of the artificial ear 1 may be (acoustically) completely exposed. That is, any sound originating from a sound source above or in front (to the right side in FIG. 1) of the artificial ear 1 can enter the hollow concha region 10 and then to the microphone 6 without obstructions.

In one embodiment of the present invention, inner pinnae elements 9 are provided in the concha region 10. The inner pinnae elements 9 introduce asymmetry to sound signals coming from above the artificial ear 1 and below the artificial ear 1.

The inner pinnae elements 9 are designed to enhance 3D localization cues and enhance front signals. The asymmetry introduced by the inner pinnae elements 9, and the amplification of front source signals contribute to a better separation of Interaural Level Differences (ILD) cues from the front and the back, respectively.

The acoustic shields 7, 8 of the artificial ear 1 are useful in robots with noise sources. For example, the noise source may be a fan arranged below or at the back of the artificial ear 1.

The acoustic shields 7, 8, and the inner pinnae elements 9 also allow the artificial ear 1 to selectively receive signals from a sound source in front of the robot that is located slightly higher than the artificial ear 1. Therefore, the artificial ear 1 of the embodiment in FIG. 1 is particularly useful for use on the head of the humanoid robot that is designed to interact with humans but shorter than humans.

Figure 2:
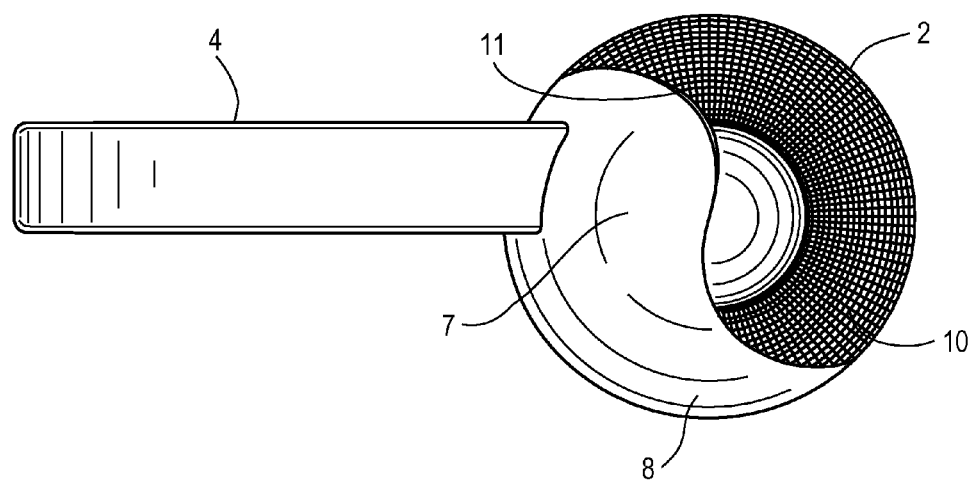
FIG. 2 illustrates a side view of an artificial ear according to one embodiment of the present invention

FIG. 2 illustrates a side view of the artificial ear 1 with an acoustically transparent cover 2, according to one embodiment of the present invention. The basic contour is defined by a symmetrical base plate 2. In one embodiment, the upper and front parts of the artificial ear 1 are covered by an acoustically transparent and optionally replaceable cover 10. The acoustically transparent cover 10 can be made from a porous or grid-like material.

In one embodiment, a line 11 separating the acoustically transparent cover 10 and the acoustic shields 7, 8 are "S" shaped or inverted "S" shaped. Specifically, the separating line 11 between the acoustically transparent cover 10 and the acoustic shields 7, 8 is a combination of a convex segment and a concave segment.

This division between the overlapping acoustic shields 7, 8 (an extension of the folded outer edge of the auricle-shaped structure 3) and the acoustically transparent cover 10 is particularly adapted for the heads of robots, especially robots shorter or having approximately the same height as an adult human (i.e., 160 cm or smaller), and designed to communicate with humans through sounds (e.g., through voice recognition).

Figure 3:
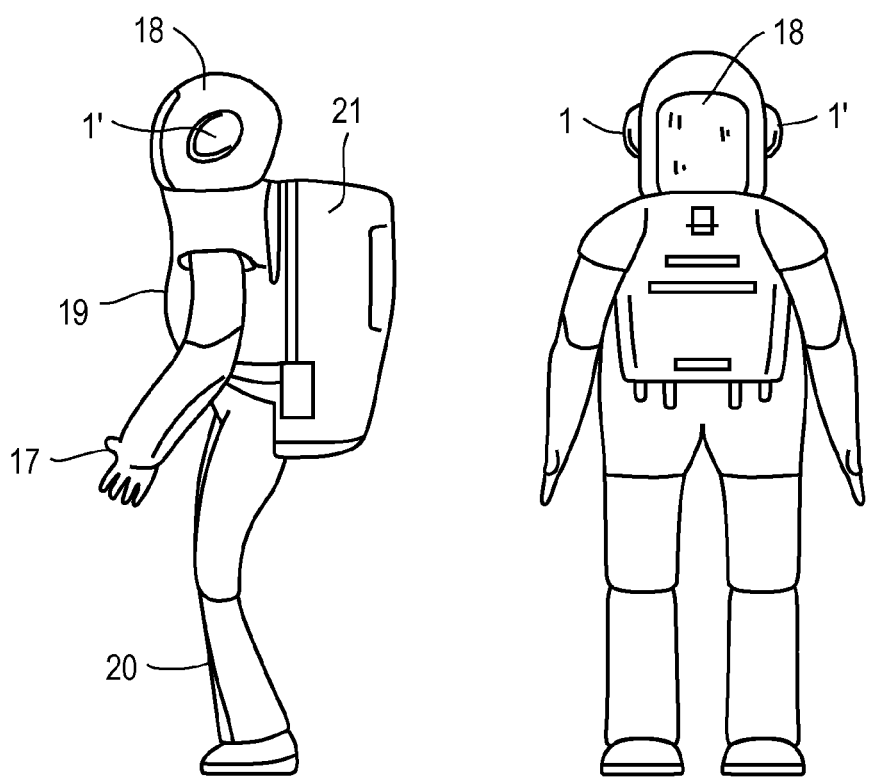
FIG. 3 illustrates a humanoid robot with an artificial ear, according to one embodiment of the present invention.

FIG. 3 illustrates a humanoid robot, according to one embodiment of the present invention. In one embodiment of the present invention, The humanoid robot, for example, is Honda's ASIMO robot that is a biped humanoid robot with two arms 17, a head 18 with two cameras 22 at the front (refer to FIG. 4), a body 19, two legs 20, and a backpack 21 containing computer hardware. The backpack can also contain a cooling fan that becomes a noise source. The artificial ears 1, 1' at the sides the head 18 of the humanoid robot should be shielded from the noise generated by the noise source.

FIG. 3 is merely illustrative. Note that the embodiments of the present invention can be used in connection with any static or moveable robot head. The "head" generally refers to a structure supporting the artificial ears that are separated by a certain distance. The term "head" is used herein to refer to any structure that can support the artificial ears.

In one embodiment, the head can be mounted on a mobile support that performs motions such as rolling or walking or on a static support. The head can simply be mounted to any other support structure and can be moveable relative to its support. Alternatively, the head can be stationary relative to its support.

Figure 4:
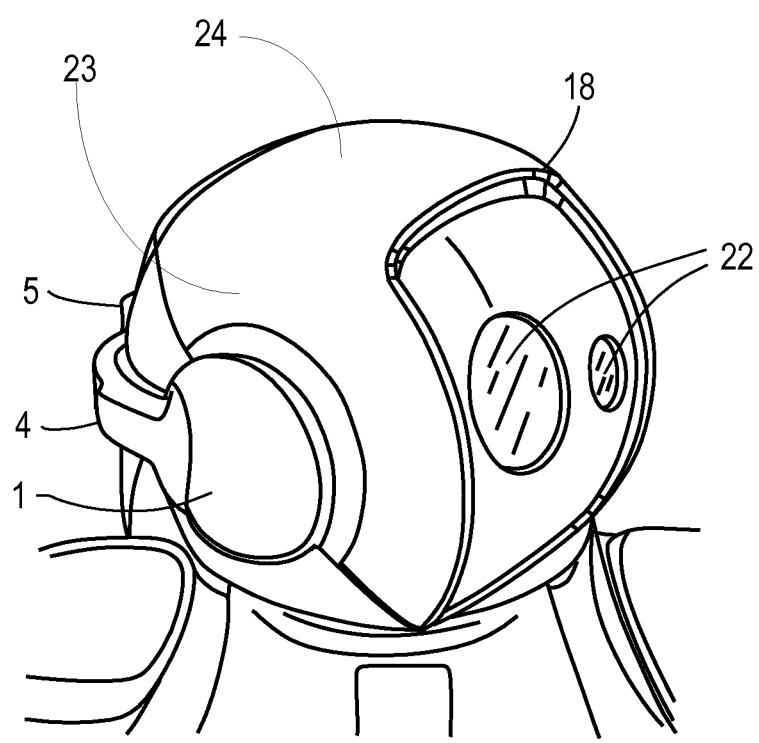
FIG. 4 illustrates a robot head according to one embodiment of the present invention.

FIG. 4 is a diagram illustrating the head 18 of a robot with the two cameras 22 at its front. In one embodiment, the artificial ears 1, 1' are connected to each other by an elastic and bendable mechanical connection member 5 shaped like an earphone-like unit that can be removed from the head 18.

In another embodiment, the auricle-shaped structure 3 of the artificial ears 1, 1' can be an integrated to the head 18.

In the embodiment of FIG. 4, the artificial ears 1, 1' are mounted on the head 18 of the robot so that the two microphones 6 of the artificial ears 1, 1' are separated by some distance. Such separation of the microphones 6 allows determination of Interaural Time Differences (ITD) that can be used for localizing the location of the sound within a so-called cone of confusion. In one embodiment, the head 18 between the microphones 6 is configured to have a shadowing effect on the sound level in order to improve the ILD.

As described briefly above, the head 18 may face the estimated location of a localized sound source by relative movements of a certain part of the robot (e.g., rotation of the head 18 relative to the body 19 of the robot) or a full body motion of the entire robot.

In one embodiment, auditory cue signals can be used to carry out sound localization, that is, the estimation of location of a sound source. The auditory cue signals include, for example, the interaural time differences (ITD) and the interaural level differences (ILD).

In one embodiment of the present invention, the sound signals are sensed via the artificial ears 1, 1'. Then the sound signals are processed by a computing unit of the robot to extract the auditory cues. The location of a sound source can be estimated, for example, by mapping the auditory cues to a coordinate system. Then, actuation commands to the head 18 or other parts of the robot can be issued to have the head 18 face the estimated location of the sound source.

In order to enhance the auditory cue signals, one embodiment of the present invention covers at least a part of the head 18 with an acoustically dampening surface adapted for reducing acoustical reflections on the head 18. Referring to FIG. 4, the acoustically dampening surface may be, for example, the side of the face 23 surrounding the artificial ears 1, 1', particularly the upper part 24 of the head 18.

In one embodiment of the present invention, the acoustically dampening surface is particularly effective for frequencies above 2 kHz to promote the detection of auditory cues of voice signals.

The acoustically dampening surface can be formed such that it is particularly effective for acoustical waves having a wave length of equal to or less than the distance between the two microphones 6 of the binaural artificial ears 1, 1'.

In one embodiment of the present invention, the acoustically dampening surface is a surface layer made from silicon material. The dampening surface is attached to at least a portion of the head 18. In addition to or as an alternative to the surface layer, the acoustically dampening surface is formed by forming acoustically dampening corrugations at the surface of the head 18.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A robot head comprising:
   binaural artificial ears, each binaural artificial ear comprising:
   an auricle-shaped structure; and
   a microphone in a concha region defined by the auricle-shaped structure, the concha region including pinnae elements to introduce asymmetry to first sound originating from a first source above each binaural artificial ear and second sound originating from a second source below each binaural artificial ear, the microphone configured to receive the first sound or the second sound and generate an electrical signal corresponding to the first sound or the second sound, the electrical signal processed to estimate a location of the first source or the second source based on auditory localization cues in the first sound or the second sound, wherein the auditory localization cues comprise interaural level differences (ILD) separated based on the asymmetry introduced by the pinnae elements into the electrical signal, wherein the electrical signal resulting from sound reflections from an asymmetrical shape of the binaural artificial ear is generated at the microphone, wherein the electrical signal is dependent on azimuth and elevation of the first source or the second source, and wherein the asymmetry is configured to increase dependency of the interaural level differences (ILD) with respect to the azimuth and the elevation of the first source or the second source;

an actuator configured to move the binaural artificial ears in at least one degree of freedom; and an upper portion of the head above the binaural artificial ears, the upper portion of the head comprising an acoustically dampening surface.

2. The robot head of claim 1, further comprising:
a computer coupled to the binaural artificial ears, the computer configured to estimate a location of the first or second sound source based on the auditory localization cues.

3. The robot head of claim 2, wherein the actuator is coupled to the computer and configured to move the robot head to face the estimated location of the first or second sound source responsive to signals from the computer.

4. The robot head of claim 1, wherein the acoustically dampening surface damps components of the first or second sound having frequencies above 2 kHz.

5. The robot head of claim 1, wherein the acoustically dampening surface damps components of the first or second sound having wavelengths equal to or less than a distance between two microphones of the artificial ears.

6. The robot head of claim 1, wherein the acoustically dampening surface is a surface layer attached to the head.

7. The robot head of claim 1, wherein the acoustically dampening surface is made of a silicone-like material.

8. The robot head of claim 1, wherein the acoustically dampening surface is formed by surface treating the head.

9. A humanoid robot comprising a robot head, a body for supporting the robot head, two legs coupled to the body, and two arms coupled to the body, the robot head comprising:
binaural artificial ears, each binaural artificial ear comprising;
an auricle-shaped structure; and
a microphone in a concha region defined by the auricle-shaped structure, the concha region including pinnae elements to introduce asymmetry to first sound originating from a first source above each binaural artificial ear and second sound originating from a second source below each binaural artificial ear, the microphone configured to receive the first sound or the second sound and generate an electrical signal corresponding to the first sound or the second sound, the electrical signal processed to estimate a location of the first source or the second source based on auditory localization cues in the first sound or the second sound, wherein the auditory localization cues comprise interaural level differences (ILD) separated based on the asymmetry introduced by the pinnae elements into the electrical signal, wherein the electrical signal resulting from sound reflections from an asymmetrical shape of the binaural artificial ear is generated at the microphone, wherein the electrical signal is dependent on azimuth and elevation of the first source or the second source, and wherein the asymmetry is configured to increase dependency of the interaural level differences (ILD) with respect to the azimuth and the elevation of the first source or the second source;

an actuator configured to move the binaural artificial ears in at least one degree of freedom; and an upper portion of the head above the binaural artificial ears, the upper portion of the head comprising an acoustically dampening surface.

10. A method for enhancing auditory localization cues sensed via binaural artificial ears, the method comprising:
capturing sound signals at a microphone in a concha region defined in an auricle-shaped structure of a binaural artificial ear and having a vertically asymmetric shape;
introducing asymmetry to first sound coming from above each binaural artificial ear and second sound coming from below binaural artificial ear by pinnae elements included in the concha region;
generating, at the microphone, an electrical signal resulting from sound reflections of the first sound or the second sound caused by an asymmetrical shape of the binaural artificial ear, wherein the electrical signal is dependent on azimuth and elevation of the first source or the second source, and wherein the asymmetry is configured to increase dependency of the interaural level differences (ILD) with respect to the azimuth and the elevation of the first source or the second source;
processing the electric signal to estimate a location of the first source or the second source based on auditory localization cues in the first sound or the second sound, wherein the auditory localization cues comprise interaural level differences (ILD) separated based on the asymmetry introduced by the pinnae elements into the electrical signal; and
providing at least an upper part of the robot head with an acoustically dampening surface.

11. The method of claim 10, wherein the acoustically dampening surface damps components of the first or second sound having frequencies above 2 kHz.

12. The method of claim 10, wherein the acoustically dampening surface damps components of the first or second sound having wavelengths equal to or less than a distance between two microphones of the artificial ears.

13. The method of claim 10, wherein the step of providing the acoustically dampening surface comprises attaching a damping surface on the head.

14. The method of claim 13, wherein the acoustically dampening surface is made of a silicone-like material.

15. The method of claim 10, wherein the step of providing the acoustically dampening surface comprises surface treating the head.

* * * * *